United States Patent Office 3,441,005
Patented Apr. 29, 1969

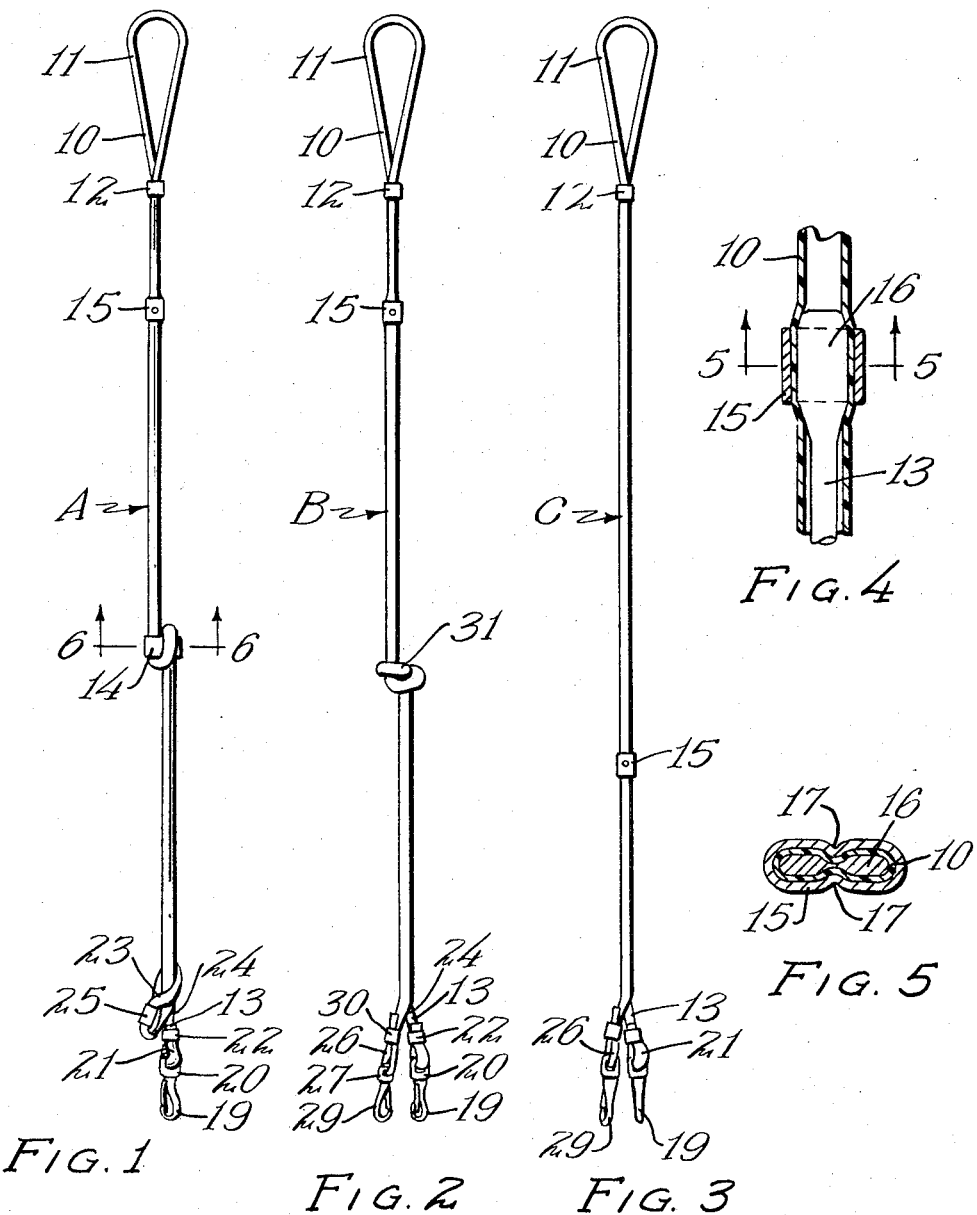

3,441,005
ANIMAL STRETCH LEAD
Justin I. Fink, 200 2nd St. SW.,
Wadena, Minn. 56482
Filed Dec. 27, 1966, Ser. No. 604,688
Int. Cl. A01k 1/06
U.S. Cl. 119—109                           7 Claims

ABSTRACT OF THE DISCLOSURE

A dog leash including a flexible tube having a handle member on one end and an elastic cord anchored within the tube with a snap fastener secured with the projecting end of the cord adapted to be connected with an animal collar.

---

This invention relates to an improvement in animal stretch lead and deals particularly with a leash which is stretchable to an adjustable extent, and which is capable of reducing yanking, jerking and severe pulling on the leash by the animal.

Various forms of leashes have been produced, some of which are stretchable in length. Leashes of this type usually incorporate springs or metal housings, making such leashes heavy, costly, and inconvenient to use. It is an object of the present invention to provide a stretch lead which is light in weight, which occupies little space when not in use, and which is inexpensive to produce.

An object of the present invention resides in the provision of a leash which, in its preferred form, includes a flexible tube which is relatively inelastic and non-stretchable, and which is provided with a handle at one end. Incorporated within the tube is a heavy duty elastic cord partially enclosed within the tube and projecting beyond the end of the tube opposite the handle end thereof. A lead snap is attached to the projecting end of the elastic shock cord designed for attachment to the collar of the animal. With this arrangement, a pull upon the elastic cord will cause the cord to stretch to absorb the shock of yanking, jerking or severe pulling by the animal.

A feature of the present invention resides in the provision of a means of adjusting the tension of the elastic cord. This is accomplished by providing means of anchoring the elastic cord to the outer tube at any point throughout the length thereof. When the elastic cord is anchored to the tube at a point adjacent the lead snap, the stretch of the elastic cord will be at a minimum. As the point of attachment between the elastic cord and the relatively inelastic tube is moved toward the handle end of the leash, the effective stretchable length of the elastic cord is increased. As a result, the length to which the elastic cord may stretch may be considerably varied.

A feature of the present invention resides in the provision of a slider through which the leash is looped, and which is slidable throughout the length of the elastic cord. The slider prevents the elastic cord from stretching between the location of the slider and the handle end of the leash. Movement of the slider accordingly adjusts the length to which the elastic cord may stretch, and accordingly adjusts the tension of the elastic portion of the leash or lead.

A further feature of the present invention lies in the fact that, in preferred form, the leash is produced with an outer tube of braided plastic which is substantially non-stretchable, but which is washable, weatherproof, and extremely strong.

A further feature of the present invention resides in the fact that, if desired, a second dog lead snap may be attached to the free end of the inelastic tube, which snap may be attached to the collar of the animal when a non-stretch type lead is desired.

A further feature of the preferred form of the invention lies in its simplicity and in the ease with which it may be constructed. The plastic braided tube is looped together at one end and fastened with a metal clip or similar fastening means to form a handle loop. The opposite end of the outer tube is also preferably looped (when a single snap is employed) the loop encircling the adjoining portion of the tube and elastic cord, and being secured by a suitable metal clip or the like. The heavy duty elastic shock cord is inserted through the braided cord at the second looped end to provide a desired length of elastic cord. The inserted end of the elastic cord is attached to the outer tube by a heavy duty metal clip or the like. If the slider is employed, it is mounted upon the cord before one end of the tube is looped. The lead snap is attached to the projecting end of the elastic cord by looping the end of the cord through the eye of the snap and securing the loop with a suitable metal clip or the like. Thus the entire assembly may be quickly and easily completed at a very low cost of production.

A further feature of the present invention resides in the fact that where a second snap is attached to the flexible outer tube, the end of the tube may be looped through the eye of the snap and secured in loop form by a suitable metal clip or the like.

While the foregoing description is specifically directed to a leash for dogs and other small animals, it is also effective for use for small children.

These and other objects and novel features of the present invention will be more clearly and fully set forth in the following specification and claims.

In the drawings forming a part of the specification,
FIGURE 1 is a view of the leash in completed form.
FIGURE 2 is a view of a slightly modified form of leash.
FIGURE 3 is a view of another slightly different form of construction of leash.
FIGURE 4 is a sectional view in enlarged form through a portion of the leash showing the manner in which the end of the elastic cord is attached to the relatively non-elastic outer tube.
FIGURE 5 is a sectional view on the line 5—5 of FIGURE 4.
FIGURE 6 is a sectional view through the slider in enlarged form, the position of the section being indicated by the line 6—6 of FIGURE 1.

The animal leash is indicated in general by the letter A. The body of the leash includes an elongated hollow tube 10 which is substantially inelastic or unstretchable in length. In its preferred form, the tube 10 is formed of braided plastic filaments which are extremely durable, water proof, weather-resistant and washable.

The upper end of the tube 10 is preferably looped as indicated at 11 to provide a handle loop. Suitable fastening means such as a metal clip 12 encircles the end of the tube 10 and a portion of the tube spaced from the end.

A heavy duty elastic shock cord 13 is inserted into the tube 10 near the opposite end thereof. The cord 13 is inserted through a hole in the wall of the tube which may be formed by merely spreading the fibers apart to form an opening. A slider 14 which is shown as being of generally rectangular cross-section, is mounted upon the portion of the tube 10 enclosing the cord 13. As is indicated in FIGURE 1 of the drawings, the cord and tube are inserted through the hollow rectangular slider 14, looped about a side of the slider, and reinserted through the slider in the same direction as the first insertion.

The cord 13 is anchored to the tube 10 by a hollow tubular clip 15 which is slid over the cord and tube to encircle the inner inserted end 16 of the cord 13. The clip 15 is then flattened and indented as indicated at 17 to firmly anchor the flattened end 16 of the cord 13 to the body of the tube 10.

A snap 19, preferably provided with a swivel eye 20 is attached to the end of the cord 13 which projects from the tube 10. The end 21 of the cord 13 is looped through the eye 20 and is held in looped condition by a suitable metal clip 22 or similar fastening means. In order to protect the end of the tube 10 and to prevent it from fraying, the end of the tube 23 is looped back about a portion of the tube near the opening 24 from which the tube 13 projects, and is held in looped form by a suitable metal clip 25 or the like. When the snap 19 is attached to the collar of a dog or other small animal, or to the harness or belt of a small child, the stretchability of the elastic cord 13 is determined by the position of the slider 14. The slider provides a snubbing action due to the manner in which the cord is looped about it, and prevents elongation of the cord relative to the tube 10 from the location of the slider 14 to the anchored end 15. As a result, the cord 13 will only stretch in the portion of the slider 14 and the snap 19. By moving the slider 14 to a position adjacent the snap end of the leash, the cord 13 is rendered virtually inelastic because of the fact that only a very short portion of the length of the elastic cord is permitted to stretch. By moving the slide 14 adjacent the clip 15 anchoring the cord 13 to the tube 10, the cord 13 is permitted to elongate to its fullest extent.

FIGURES 2 of the drawings discloses a slightly modified form of leash B. The leash B is formed of the same component parts including the tube 10 and cord 13. The upper end of the tube is looped as indicated at 11 and secured with the clip 12 as described. A heavy duty clip 15 anchors the inner end of the cord 13 to the inelastic tube 10.

In the arrangement illustrated in FIGURE 2, the projecting end of the cord 13 is looped through the eye 20 of a snap 19 and anchored as indicated at 22. The end of the tube 10 which is beyond the opening 24 through which the cord 13 extends is also looped as indicated at 26 through the swival eye 27 of a second snap 29, and is held engaged by a suitable metal clip 30 or similar fastening means. The purpose of this arrangement is to provide both a stretchable lead formed by the cord 13, or a substantially non-stretchable lead formed by the tube 10. In other words, when the snap 19 is attached to the collar of the animal, a stretchable lead is provided, while by securing the collar to the snap 29, a relatively non-flexible lead is provided.

If desired, the effective length of the stretchable cord 13 may be adjusted by knotting the cord as indicated at 31, or providing a slide such as 14. The use of the slide 14 is usually preferred due to the simplicity with which the adjustment may be made. The knotting of the cord as indicated at 31 will accomplish a similar result, but to adjust the length of the stretchable cord 13, the knot must be united and another knot made.

The form of construction illustrated in FIGURE 3 of the drawings is indicated by the letter C, and conains the same components as the leash B, the parts accordingly being similar numbered. The structure shown in FIGURE 3 differs from the form of construction B only in that the clip 15 securing the cord 13 to the tube 10 is located at a substantial distance from the handle end of the leash, thereby providing a leash which will stretch to a limited extent when the collar is atached to snap 19, or a leash which is relatively instretchable, when the collar is secured to the snap 29.

In accordance with the Patent Office statutes, I have described the principles of construction and operation of by improvement in animal stretch lead, and while I have endeavored to set forth the best embodiment thereof, I desire to have it understood that changes may be made without departing from the spirit of my invention.

I claim:
1. A stretch lead including:
   a flexible tube of relatively instretchable material,
   a handle member at one end of said tube,
   an elesatic cord having one end anchored within said tube at a point spaced from the other end of said tube and projecting from said other end,
   a snap fastener anchored to the projecting end of said cord, and
   means connecting the tube and the cord at any point between said point of anchorage and said other ends of said tube and cord, said connecting means preventing said cord from stretching between said connecting means and said point of anchorage, whereby tension applied to the projecting end of said cord will stretch only that portion of the cord between said connecting means and said other end thereof.

2. The structure of claim 1 and including a second snap fastener attached to said tube at the said other end thereof.

3. The structure of claim 1 and in which said tube is made of braided plastic filaments.

4. The structure of claim 1 and in which said one cord end is anchored to said tube at a point in closely spaced relation to said handle member.

5. The structure of claim 1 and in which said one end of said cord is anchored to said tube at a point nearer said projecting end than to said one end.

6. The structure of claim 1 and in which said adjustable connecting means comprises a slider about which a portion of said tube enclosing said cord is looped, the slider being slidable longitudinally of said tube.

7. A stretch lead including;
   a flexible tube of relatively instretchable material,
   a handle member at one end of said tube,
   an elastic cord having one end anchored within said tube at a point spaced from the other end of said tube and projecting from said other end,
   a snap fastener anchored to the projecting end of said cord, and
   a clamp encircling said tube and said one end of said cord for anchoring the tube and cord together.

References Cited

UNITED STATES PATENTS

| | | | |
|---|---|---|---|
| 2,275,701 | 3/1942 | Taylor | 119—109 |
| 2,652,809 | 9/1953 | Foster | 119—109 X |
| 2,821,168 | 1/1958 | Forbes | 119—109 |

HUGH R. CHAMBLEE, *Primary Examiner.*